United States Patent

[11] 3,629,049

| [72] | Inventor | Eugene L. Olcott<br>Falls Church, Va. |
|---|---|---|
| [21] | Appl. No. | 592,846 |
| [22] | Filed | Nov. 8, 1966 |
| [45] | Patented | Dec. 21, 1971 |
| [73] | Assignee | The Susquehanna Corporation |

[54] SHAPED PYROLYTIC GRAPHITE ARTICLES
9 Claims, 7 Drawing Figs.

[52] U.S. Cl..................................................... 161/60,
117/46, 117/118, 161/143
[51] Int. Cl........................................................ B29h 17/28,
B32b 3/14
[50] Field of Search............................................ 156/1,
172–175; 161/59, 60, 143; 117/46 C, 106, 107,
107.1, 119, 119.2, 119.6, 119.8; 252/421, 502

[56] References Cited
UNITED STATES PATENTS

| 3,367,812 | 2/1968 | Watts............................ | 161/Carbon |
| 3,369,920 | 2/1968 | Bourdeau et al.............. | 117/46 |

*Primary Examiner*—Jacob H. Steinberg
*Assistant Examiner*—Mark A. Litman
*Attorney*—Martha L. Ross ABSTRACT: A shaped pyrolytic graphite article comprising a pyrolytic graphite matrix containing embedded therein at least one reinforcing carbon strand layer. The carbon strand layer comprises a plurality of unidirectional and substantially parallel, laterally spaced, individual, continuous carbon strands. The matrix comprises crystallite layers of pyrolytic graphite nucleated from each of the individual carbon strands and interconnected to form a continuous phase surrounding and interconnecting the individual strands comprising the embedded strand layer.

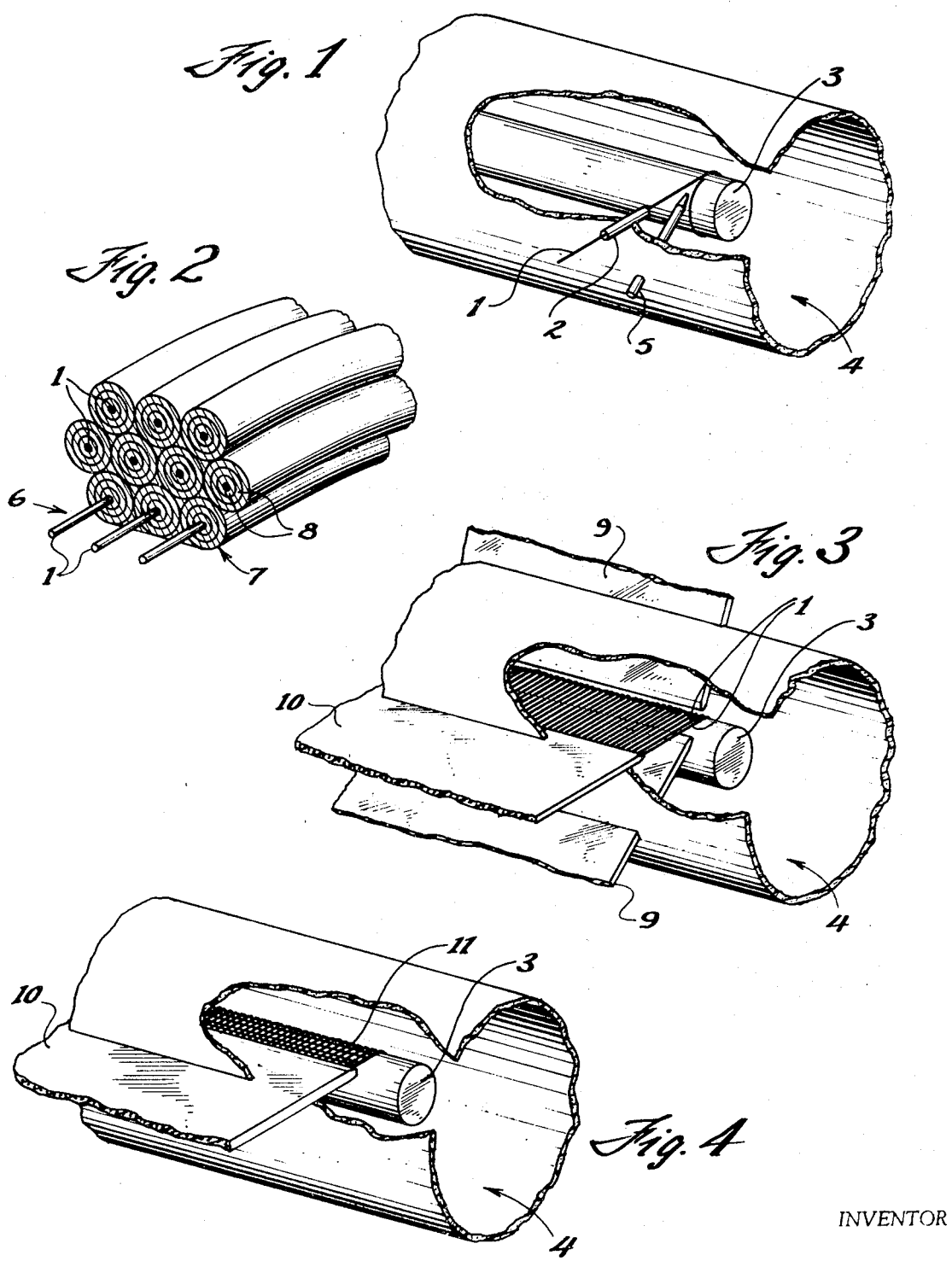

INVENTOR
EUGENE L. OLCOTT
BY Thomas N. Wallin
ATTORNEY

SHAPED PYROLYTIC GRAPHITE ARTICLES

Pyrolytic graphite is a polycrystalline form of carbon prepared by pyrolysis of carbonaceous gases on heated substrates. As is known, other vapors such as boron chlorides, or organic halo silanes can be copyrolyzed with carbonaceous gas to deposit pyrolytic graphite alloys or compounds such as boron carbide or silicon carbide, for example, on the substrate. The term "pyrolytic graphite" is used herein to include such alloys and compounds as well as "pure" pyrolytic graphite. The material is resistant to chemical attack and its strength increases with increasing temperature. Thus, pyrolytic graphite has recognized potential for use in high temperature, chemically corrosive environments. However, the full potential of the material has not hitherto been realized.

To date, the material has been used, primarily, in the form of shaped, unreinforced articles since known pyrolytic graphite deposition techniques are not readily adaptable to formation of composites. For example, in attempts to form composites by depositing pyrolytic graphite within skeletal carbon structures, such as porous blocks, felts, or woven cloths, it is found that carbonaceous gas cannot be forced to the interior of the structure due to the formation of impervious pyrolytic graphite deposits on the structure surface.

The size, shape, and utility of unreinforced, shaped pyrolytic graphite articles has been limited by inherent characteristics of the material. Conventional pyrolytic graphite articles comprise essentially continuous stacked layers of graphite crystallites, oriented in directions parallel to the substrate surface on which the article is formed. Due to the oriented crystal structure, pyrolytic graphite is highly anisotropic. In the direction of crystallite layer orientation, the material has high-tensile strength, a low linear coefficient of thermal expansion, and high electrical and thermal conductivity. However, since the crystallite layers are weakly bonded, the material is relatively weak in the thickness dimension. Also, in the thickness direction, the material has a high coefficient of expansion and low thermal and electrical conductivity.

Due to anisotropic expansion coefficients of pyrolytic graphite, closed-shell structures, such as cylinders, have residual stresses at temperatures above or below the formation temperature of the structure. These stresses are largely concentrated in the relatively weak thickness dimension of the material and generally result in delamination if the ratio of the wall thickness to the radius of the structure exceeds about 0.05. This thickness-to-radius ratio limit often precludes fabrication of closed-shell structures having wall thicknesses sufficient to provide the strength required for a given application.

Due to the inherent tendency for curved pyrolytic graphite surfaces to distort or delaminate, pyrolytic graphite is generally fabricated in the form of flat planes. Articles having curved surfaces are conventionally prepared by bonding together a plurality of segments cut from such flat plates. Unfortunately, adhesives presently available for bonding the graphite segments do not possess the unique high-temperature properties of pyrolytic graphite. Thus, the utility of the composite structure is limited by the characteristics of the adhesive. Furthermore, the graphite crystallite layer "edges" exposed on the curved surfaces of such segmented articles do not provide maximum resistance to oxidation or other forms of chemical attack.

It is an object of this invention to provide an improved, reinforced pyrolytic graphite.

A further object is to provide reinforced pyrolytic graphite composites having improved strength in the thickness dimension and greater resistance to delamination.

Still another object of this invention is to provide novel methods of preparing reinforced pyrolytic graphite composites. Other objects and advantages will be apparent from the following description and the drawings wherein:

FIG. 1 is a schematic illustration of apparatus for practicing this invention;

FIG. 2 is a schematic illustration of a reinforced pyrolytic graphite composite according to this invention;

FIG. 3 and 4 are schematic representations of modified apparatus suitable for use in preparing pyrolytic graphite composites;

Figure 5:
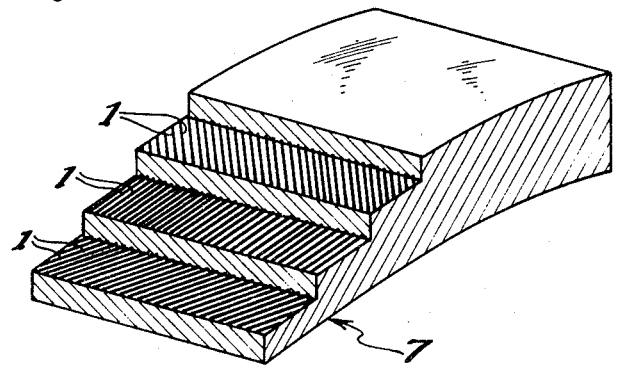
Figure 6:
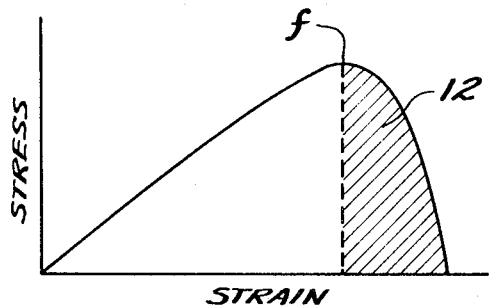
Figure 7:
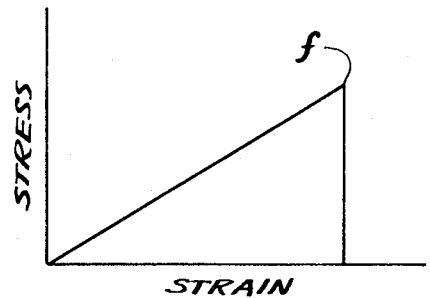

FIG. 5 schematically illustrates an alternative arrangement of reinforcing strands in the composite of this invention; and FIG. 6 represents a stress-strain curve characteristic of the composite material of this invention; and FIG. 7 represents a stress-strain curve characteristic of conventional pyrolytic graphite.

I have discovered methods of depositing pyrolytic graphite on spaced carbon strands to prepare new and improved composite materials. Basically these methods comprise progressively positioning continuous carbon strands on a shaped form and depositing pyrolytic graphite on the strand as it is positioned to build up a composite structure. Thus the difficulties inherent in previously attempted impregnation attempts are avoided.

Any continuous carbon strand such as, for example, those prepared by pyrolysis of rayon can be utilized in the practice of this invention. The continuous carbon strand can be in the form of an individual strand, a plurality of spaced, substantially unidirectionally oriented individual strands which can be simultaneously positioned as a strand layer, or a woven material such as cloth or tape.

The method can be practiced with apparatus such as that schematically illustrated in FIG. 1. As shown therein, a continuous, individual carbon strand 1, is fed through a guide tube 2, and connected to a mandrel 3, disposed in a chamber 4. In order to prevent oxidation of carbonaceous gas, atmospheric oxygen is removed and continuously excluded from the chamber by evacuation and/or purging with inert gases such as helium or nitrogen. The strand is heated to and maintained at a temperature sufficient to pyrolyze carbonaceous gases by induction, radiant, or resistance heating means, not shown. The mandrel is rotated and moved longitudinally relative to the strand guide tube 2, by means not shown. In this manner, spaced turns of strand are progressively positioned on the mandrel. As the strand is wound, carbonaceous gas is fed through tube 5, to impinge upon the strand at about the point of winding contact. Pyrolysis of the gas occurs and a pyrolytic graphite matrix is nucleated from the heated strand substrate. As winding continues, pyrolytic graphite is simultaneously deposited on the strand being wound and on the matrix deposited on previously wound strands. Thus, the strands are not only individually enveloped in a pyrolytic graphite matrix but are interconnected and bonded to each other by the matrix. The winding is continued to produce a composite article such as schematically illustrated in FIG. 2. As shown, the article comprises one or more spaced, reinforcing carbon strand layers 6, each of which comprises a plurality of spaced carbon strands 1, disposed in and interconnected by a pyrolytic graphite matrix 7, composed of graphite crystallite layers 8.

It is seen that the crystallite layers of the matrix in the composite are oriented in conformity to surfaces of the strands and are, therefore, aligned around the strands and in the direction of strand orientation. Crystallite alignment in the direction of strand orientation provides the maximum strength of pyrolytic graphite in that direction. Furthermore, the embedded strands significantly reinforce the composite in the direction of strand orientation.

Since the orientation of crystallite layers conforms to the strand surfaces rather than the surface of the composite, the composite does not have the continuous laminar structure characteristic of conventional pyrolytic graphite. The absence of continuous laminae advantageously tends to prevent propagation of cracks and delaminations. Composite strength in the thickness direction is significantly improved by the increased degree of crystallite layer alignment in that direction. In addition, the orientation of crystallite layers in the composite renders the material less anisotropic than conventional pyrolytic graphite.

The carbon strands also prevent delamination failures by restricting the thickness of laminar matrix growth units nucleated from these strands. It is known that growth units less than 0.05 inches thick are less subject to delamination. Since, in the composition of this invention, the thickness of laminar units is generally about one-half the distance between the strands; preferred unit size is obtained by spacing the strands within about 0.1 inch of each other.

The process for composite fabrication can be practiced with individual carbon strands as in the embodiment described or with multistrand structures such as a plurality of laterally spaced, unidirectionally oriented individual carbon strands, or with woven cloths or tapes comprising carbon strands oriented in both warp and woof directions. When using multistrand structures to prepare a composite, it is preferred to simultaneously impinge carbonaceous gas on both sides of the strand structure as it is progressively laid down to ensure that the gas penetrates between the strands to effect the highest degree of lateral bonding. This can be accomplished by apparatus such as schematically illustrated in FIG. 3, wherein gas injector channels 9, feed gas into contact with spaced strands 1, or by apparatus as shown in FIG. 4, wherein woven carbon cloth 11 and gas are both fed through guide channel 10.

When the method is practiced with woven fabrics, little matrix bond is obtained between strands where warp and woof intercross since it is difficult for the carbonaceous gas to penetrate between the touching strands. It is, therefore, preferred that all strands in each reinforcing strand layer in the composite of this invention be substantially unidirectionally oriented. Such orientation eliminates weaknesses which result from the absence of a matrix bond at points of strand to strand contact. In composites having multiple reinforcing strand layers, the direction of strand orientation can be varied in different reinforcing layers as shown, for example, in FIG. 5. Thus composites having desired directional strength characteristics can readily be prepared.

This invention can, of course, be practiced by positioning strand on a variety of shaped forms to produce articles having the desired configuration. The strand can be progressively positioned on the shaped form by any desired technique, however, winding is preferred for reasons of simplicity. It will be understood from the foregoing discussion that the term "progressively" positioning connotes a gradual laying down of strand to continuously and progressively increase the area of strand contact with the shaped form rather than effecting overall lateral strand contact as by "stacking." This permits matrix formation between strands as they are positioned and eliminates the necessity of forcing carbonaceous gas between prepositioned strands.

When the invention is practiced with carbon yarns which comprise a multiplicity of fibers which have been spun or otherwise incorporated to form the continuous strand, the pyrolytic graphite may, in some instances be deposited on fibers or fuzz protruding from the strand rather directly on the base strand. Therefore, in order to obtain optimum lateral bonding of strands by the matrix, it may be desirable to minimize such protrusions as, for example, by mechanically removing them with a scraper blade as the matrix is built up or by utilizing strands precoated with pyrolytic graphite to provide a smooth surface.

The practice of this invention is further illustrated by the following examples:

EXAMPLE 1

Grade WYB yarn, a carbon strand comprising about 720 filaments in cross section which is manufactured by Carbon Products Division of Union Carbide Corporation, was progressively wound as an individual strand around a 1 inch cylindrical mandrel disposed in a chamber containing nitrogen gas at pressure slightly greater than atmospheric to prevent entry of atmospheric oxygen. The strand was inductively heated to about 2,000° C. and contacted, as it was wound at about the point of winding contact with methane diluted about 8:1 by volume with nitrogen. A scraper blade was utilized to remove pyrolytic graphite coated filaments protruding from the side of the strand. The mandrel was moved longitudinally to effect a spacing of about one thirty-second of an inch between successive turns and winding was continued until a composite having seven layers of strands was produced. Upon cooling, the cylindrical composite having a wall thickness of about 0.1 inches was removed from the mandrel. No delaminations were observed in this closed-shell structure although the ratio of thickness-to-radius was about 0.2 approximately four times as great as the thickness-to-radius ratio previously considered to be a limitation for satisfactory closed-shell structures. To determine the suitability of the material for high-temperature applications, strength tests were performed at a temperature of about 2,000° C. The composite material exhibited a strength (expressed in lbs. per square inch) to weight (expressed in lbs. per cubic inch) ratio of about 340,000. The reported strength to weight ratio of conventional pyrolytic graphite in the direction of highest strength at the same temperature is about 250,000.

EXAMPLE 2

A composite cylinder about 0.25 inches long, about 1 inch in diameter and having a wall thickness of about 0.1 inches was prepared according to the above procedure and inserted in the throat of a rocket motor nozzle. The insert was tested in a motor firing, utilizing an aluminized propellant. During this firing, the nozzle insert was subjected to a maximum pressure of greater than 1,000 p.s.i., an average pressure of about 750 p.s.i. and a temperature of about 3,000° C. for about 42 seconds. Even under these severe conditions, the erosion rate of the composite was only about 0.00052 inches per second. Thus, it is seen that the composite is highly resistant to erosion from high temperature, high pressure gas flows.

EXAMPLE 3

Stress-strain measurements were made on composite materials prepared according to example 1. The characteristic stress-strain curve determined by such measurements is illustrated in FIG. 6. Point "$f$" on this curve represents the initiation of mechanical failure in the composite. The shaded area 12 under the curve represents the additional energy required to propagate the failure. For comparison, a stress-strain curve characteristic of conventional pyrolytic graphite is shown in FIG. 7. It is seen that whereas mechanical failures in conventional pyrolytic graphite are essentially instantaneously propagated resulting in complete failure of the material, substantial additional energy is required to produce complete mechanical failure of the composite of this invention.

The material of this invention can be advantageously utilized as a material of construction or liner for molds, particularly those used in high-temperature molding operations, reaction vessels, orifices, and in various other applications requiring materials which possess high strength at high temperatures.

While this invention has been described with reference to illustrative embodiments, it will be apparent that various modifications thereof can be practiced based on the above disclosure without departing from the spirit and scope of the invention embodied within the claims.

I claim:

1. A shaped pyrolytic graphite article comprising a pyrolytic graphite matrix containing embedded therein at least one reinforcing carbon strand layer, said strand layer comprising a plurality of unidirectional and substantially parallel, laterally spaced, individual, continuous carbon strands, said matrix comprising crystallite layers of pyrolytic graphite nucleated from each of said individual strands and interconnected to form a continuous phase surrounding and interconnecting each of said individual strands comprising said embedded at least one strand layer.

2. The shaped pyrolytic graphite articles of claim 1 wherein said at least one reinforcing carbon strand layer comprises a plurality of layers.

3. The shaped pyrolytic graphite article of claim 2 wherein the unidirectional, substantially parallel strands comprising at least one carbon strand layer are oriented in a direction different from the unidirectional, substantially parallel strands comprising at least one other carbon strand layer.

4. The shaped pyrolytic graphite article of claim 1 wherein said individual continuous carbon strands have a lateral spacing between adjacent strands of substantially no greater than about 0.1 inch.

5. The shaped pyrolytic graphite article of claim 2 wherein said individual continuous carbon strands have a lateral spacing between adjacent strands of substantially no greater than about 0.1 inch.

6. The shaped pyrolytic graphite article of claim 3 wherein said individual continuous carbon strands have a lateral spacing between adjacent strands of substantially no greater than about 0.1 inch.

7. The shaped pyrolytic graphite article of claim 1 wherein said individual, continuous carbon strands are precoated with pyrolytic graphite.

8. The shaped pyrolytic graphite article of claim 2 wherein said individual, continuous carbon strands are precoated with pyrolytic graphite 9. The shaped pyrolytic graphite article of claim 3 wherein said individual, continuous carbon strands are precoated with pyrolytic graphite.

* * * * *